Aug. 11, 1925.

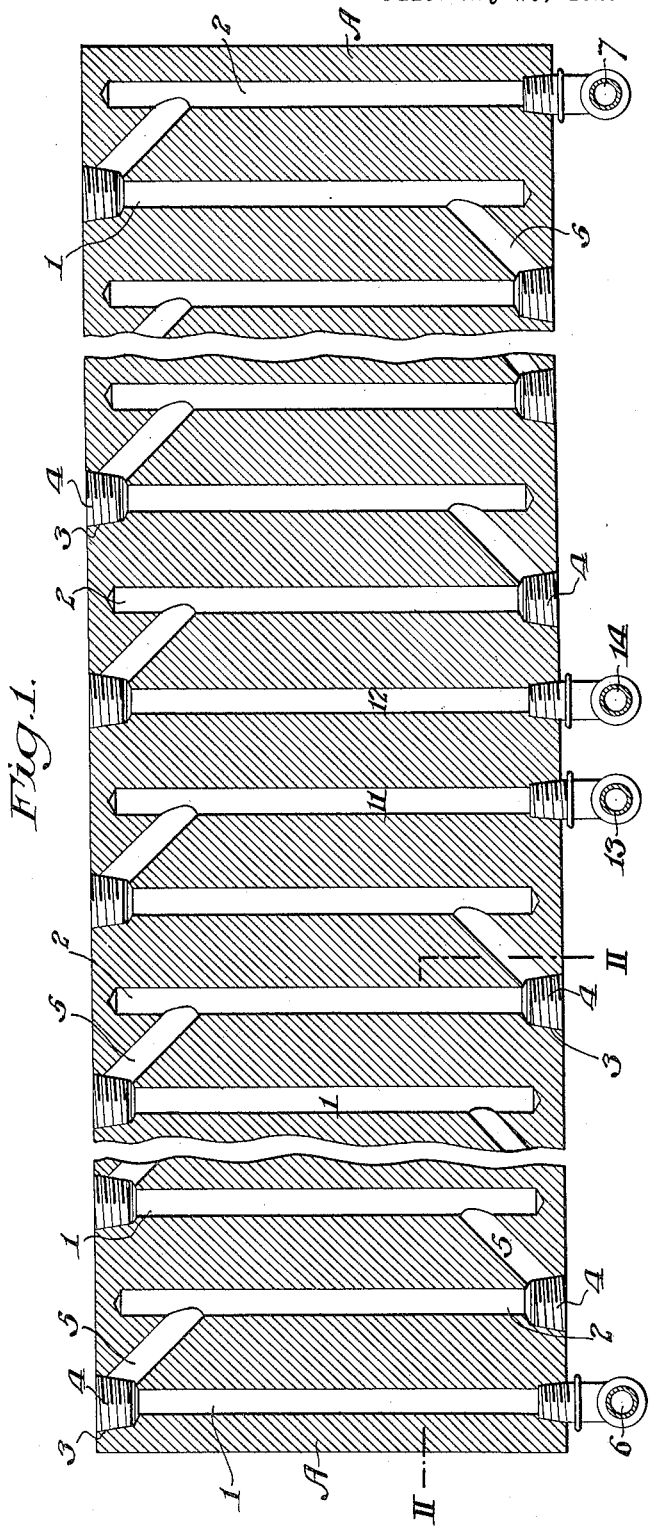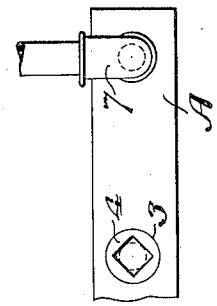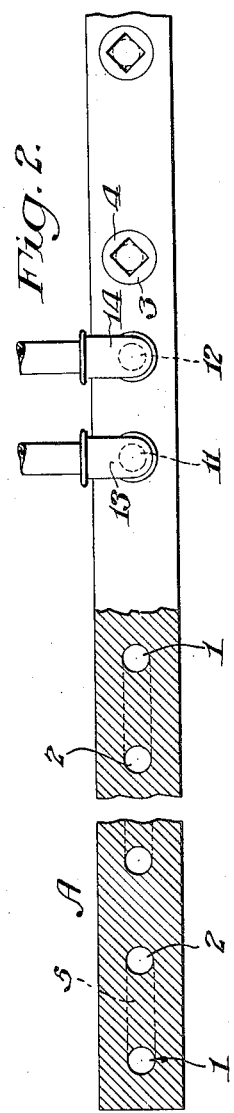

R. W. DINZL

STEAM PLATEN

Filed May 23, 1923

Inventor:
Richard W. Dinzl,
By Murray C. Boyer
Attorney.

Patented Aug. 11, 1925.

1,549,464

UNITED STATES PATENT OFFICE.

RICHARD W. DINZL, OF BYWOOD, PENNSYLVANIA, ASSIGNOR TO SOUTHWARK FOUNDRY & MACHINE COMPANY, OF PHILADELPHIA, PENNSYLVANIA, A CORPORATION OF PENNSYLVANIA.

STEAM PLATEN.

Application filed May 23, 1923. Serial No. 640,863.

*To all whom it may concern:*

Be it known that I, RICHARD W. DINZL, a citizen of the United States, and a resident of Bywood, Delaware County, Pennsylvania, have invented certain new and useful Improvements in Steam Platens, of which the following is a specification.

My invention relates to steam plates or as they are called, "platens", such as are employed with power presses in the curing of rubber and composition goods, or for other purposes where a heated plate is required, such plates or platens having internal passages for the circulation of steam or other heating medium, and for this purpose provision is made for connecting suitable pipes to the said plates or platens for the introduction and withdrawal of such heating medium. In order that such heating medium, whether liquid or fluid, may be circulated continuously throughout the whole extent of the platen, the passages therein are in communication with each other and provide a continuous path.

The present invention comprises a plate having cross passages placed relatively close together and paralleling each other, at right angles to the sides of the plate, with shorter passages diagonally disposed, connecting pairs of said cross passages at or adjacent to their ends, so that a continuous passage or conduit for the circulation of the heating medium is provided.

These and other features of my invention are more fully described hereinafter, reference being had to the accompanying drawings, in which:

Figure 1, is a sectional plan view of one form of heating plate within the scope of my invention.

Fig. 2, is a side elevation of the same partly in section, on the line II—II, Fig. 1.

Figure 3:
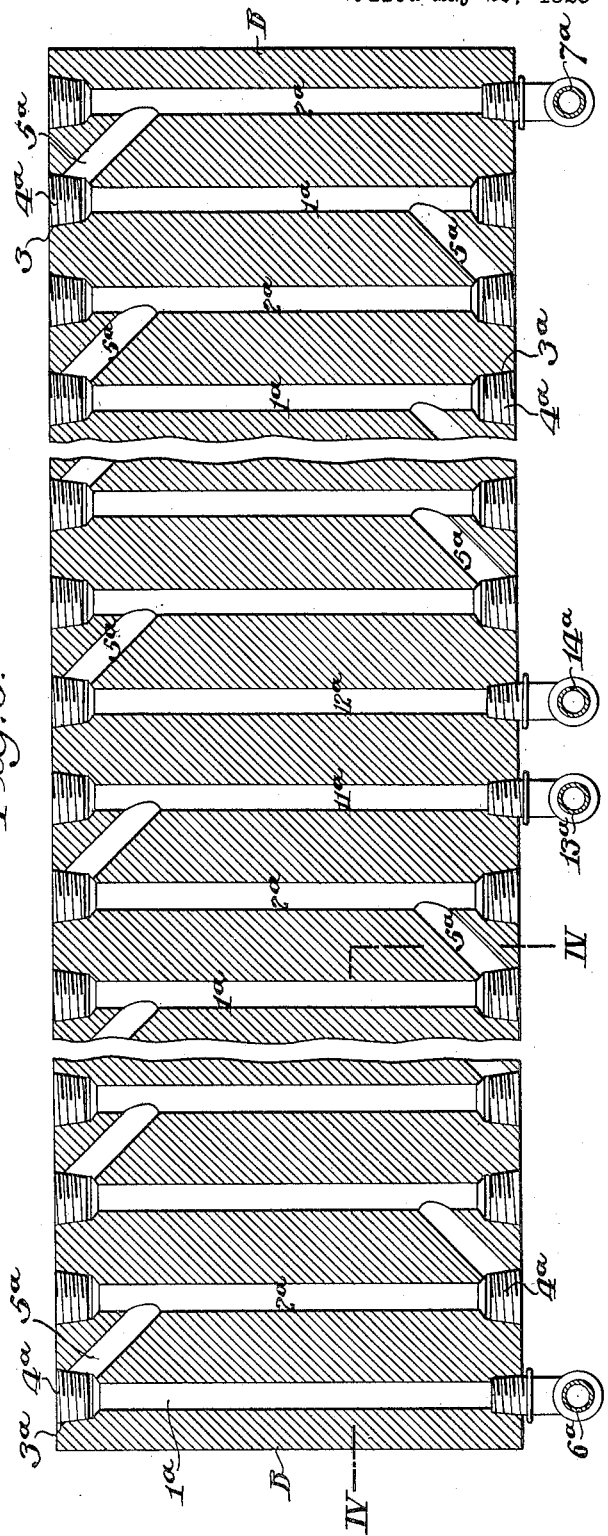
Fig. 3, is a view similar to Fig. 1, illustrating a modified arrangement within the scope of my invention.

The improved platens made in accordance with my invention are of substantially the same type and for a purpose identical with those disclosed in the application of F. G. Schranz, filed Jan. 10, 1923, Serial No. 611,718, to which reference may be made.

In one arrangement, according to my invention, a plate or platen A, Figs. 1 and 2, is provided with a series of paralleling cross passages 1 and 2, at right angles to the longer edges of the plate, which passages may extend almost, but not entirely, through the plate from edge to edge of the same; that is to say, passage 1 extends from one edge to a point near the opposite edge of the plate, while passage 2 extends from said last mentioned edge to a point near the edge through which passage 1 opens.

The open ends of the passages 1 and 2 are enlarged as indicated at 3 by the use of a reaming tool or other suitable instrument, and are subsequently threaded for the reception of plugs 4, preferably tapered, to close the same. Each pair of passages, 1 and 2, is connected at one end by a short passage 5, diagonally disposed; the reamed openings 3 of the passages 1 and 2, which are subsequently closed by the plugs 4, permitting the drilling of these short connecting passages, which may be of the same diameter as the main cross passages 1 and 2 or less, as may be desired.

In the form of structure illustrated in Figs. 1 and 2, the passages 1 extend from one side of the plate, and the passages 2 extend from the opposite side of the plate; the diagonal passages 5 connecting said cross passages alternating on opposite sides of the plate.

Figure 4:
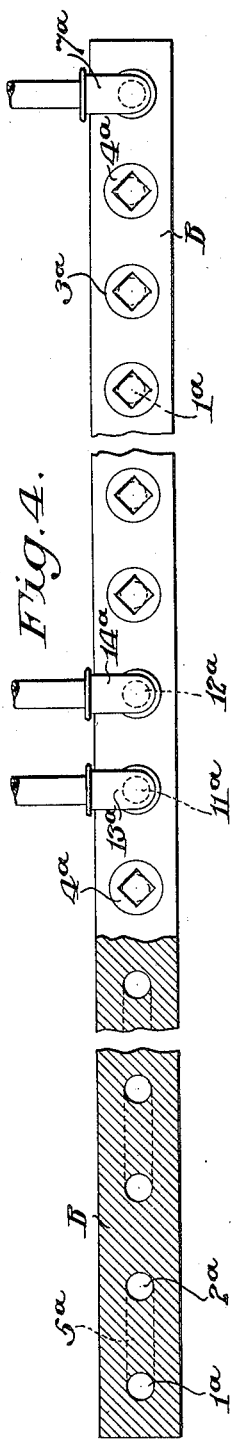
Fig. 4, is a side elevation, partly in section, on the line IV—IV, Fig. 3.

In the form of plate illustrated at B, in Figs. 3 and 4, the passages 1ª and 2ª which parallel each other across said plate, extend from side to side (or edge to edge) of the same at right angles thereto, and each set of opening 3ª at the respective sides or edges of the plate are reamed or otherwise enlarged for the reception of and subsequent closure by plugs 4ª. In this arrangement, of course, the diagonal passages 5ª may extend in either direction, as desired, with respect to the sides of the plate and in either direction, as desired, with respect to said cross passages.

The passages at the ends of the respective plates are provided with connections 6, (6ª), and 7, (7ª), for inlet and/or discharge of the heating medium, and in long plates, it may be desirable to provide a plurality of sets of steam connections. In such instance, cross passages 11 (or 11ª) and 12 (or 12ª) disposed at the central portion of the plate, or at other points, may be equipped with connections 13 (or 13ª) and 14 (or 14ª) to admit and/or discharge the heating medium from and/or to a suitable source; all of the said connections, both for inlet and discharge of the heating medium, being preferably disposed at one side of the plate.

As may be readily understood, manufacture of plates of this type is readily accomplished since the cross passages in the same are drilled, and gangs of drilling tools can be presented at the edges of the same; each tool of each gang engaging the metal at the same time. After the cross passages are drilled, the ends of the same are reamed for the reception of the closing plugs 4 (or 4ª), but before these reamed ends are threaded for the reception of said plugs, the diagonal passages 5 (or 5ª) are formed. This is a relatively simple operation since the drill points can find a definite wall against which drilling can commence in the angle at the root of the enlarged recesses which receive said plugs.

I claim:

1. A heating platen comprising a thin-walled metal plate having parallel cross passages in relatively close arrangement with certain of said passages extending to at least one edge of the platen and short diagonal passages connecting pairs of said cross passages and extending only from a point where one of said pairs of cross passages open through the edge of the plate to an adjacent cross passage, in combination with means for closing the open ends of said cross passages.

2. A heating platen comprising a thin-walled metal plate having parallel cross passages extending from edge to edge of the platen, and short diagonal passages connecting pairs of said cross passages to form a continuous conduit; said diagonal passages extending from the open end of one of a pair of said cross passages to the adjacent passage of said pair; said open ends being recessed, and screw plugs fitting said recesses for closing said open ends.

3. A heating platen comprising a thin-walled metal plate having a continuous conduit for the circulation of a heating medium; said conduit being made up of a series of closely set parallel cross passages and short diagonal passages connecting pairs of said cross passages and extending only from the open end of one cross passage to the adjacent cross passage of said pair alternately at opposite sides or edges of the platen; said cross passages extending entirely through the platen, and removable screw plugs closing the ends of said passages.

4. A heating platen of rectangular form comprising a thin-walled metal plate having cross passages paralleling each other and extending from edge to edge of the platen at right angles to the side of the platen, screw plugs for closing the open ends of said passages; said open ends being recessed for the reception of said screw plugs, and short diagonal passages connecting pairs of said cross passages and extending from the recess receiving the screw plug to the adjacent passages of said pairs.

In witness whereof I have signed this specification.

RICHARD W. DINZL.